US008432842B2

(12) United States Patent
Krieter (10) Patent No.: US 8,432,842 B2
(45) Date of Patent: Apr. 30, 2013

(54) SYSTEM AND METHOD FOR PROVIDING WI-FI ACCESS TO ELECTRONIC DEVICES IN A PERSONAL AREA NETWORK (PAN)

(76) Inventor: Marcus Krieter, Newport Beach, CA (US)

( * ) Notice: Subject to any disclaimer, the term of this patent is extended or adjusted under 35 U.S.C. 154(b) by 351 days.

(21) Appl. No.: 12/790,808

(22) Filed: May 29, 2010

(65) Prior Publication Data
US 2011/0292920 A1    Dec. 1, 2011

(51) Int. Cl.
*H04B 7/00* (2006.01)
*H04W 4/00* (2009.01)
*H04L 12/56* (2006.01)
*G06F 15/16* (2006.01)

(52) U.S. Cl.
USPC ........ 370/310.2; 370/315; 370/338; 370/400; 455/422.1; 709/203

(58) Field of Classification Search .......... 370/310–350; 455/414.3, 422.1, 426.1; 709/201–203, 217–219, 709/223–224, 229, 249
See application file for complete search history.

(56) References Cited

U.S. PATENT DOCUMENTS

| 7,260,360 | B2 |   | 8/2007  | Seo                    |
|-----------|----|---|---------|------------------------|
| 7,526,539 | B1 |   | 4/2009  | Hsu                    |
| 7,539,533 | B2 | * | 5/2009  | Tran ............ 600/509 |
| 7,801,058 | B2 | * | 9/2010  | Wang ............ 370/254 |
| 7,825,793 | B1 | * | 11/2010 | Spillman et al. ...... 340/539.1 |
| 8,103,333 | B2 | * | 1/2012  | Tran ............ 600/509 |
| D662,960  | S  |   | 7/2012  | Krieter                |
| 8,302,030 | B2 | * | 10/2012 | Soroca et al. ...... 715/810 |
| 2004/0117513 | A1 |   | 6/2004  | Scott                |
| 2007/0058634 | A1 | * | 3/2007  | Gupta et al. ...... 370/392 |
| 2007/0061041 | A1 |   | 3/2007  | Zweig               |
| 2007/0239317 | A1 |   | 10/2007 | Bogolea             |
| 2008/0159280 | A1 |   | 7/2008  | Hwang               |
| 2010/0172287 | A1 |   | 7/2010  | Krieter             |
| 2010/0177660 | A1 | * | 7/2010  | Essinger et al. ...... 370/254 |
| 2010/0260061 | A1 | * | 10/2010 | Bojahra et al. ...... 370/252 |

(Continued)

FOREIGN PATENT DOCUMENTS

| CN | 2886711    | 4/2007 |
| CN | 101511133  | 8/2009 |

OTHER PUBLICATIONS

Gill, Khusvinder et al., A ZigBee-Based Home Automation System, IEEE Transactions on Consumer Electronics, May 2009, vol. 55, No. 2, pp. 422-430.

(Continued)

*Primary Examiner* — Tri H Phan
(74) *Attorney, Agent, or Firm* — Henry J. Cittone; Cittone & Chinta LLP (57) ABSTRACT

A system and method for providing Wi-Fi access to electronic devices is disclosed. A plurality of electronic devices in a PAN is provided. A Wi-FI compatible server is associated with each electronic device in the PAN. The Wi-Fi compatible server associated with each electronic device is capable of configuring a HTML data for the associated electronic device. The HTML data associated with each electronic device is then provided to a WLAN device for providing Wi-Fi access to each electronic device in the PAN.

13 Claims, 5 Drawing Sheets

U.S. PATENT DOCUMENTS

| | | | |
|---|---|---|---|
| 2011/0051703 A1* | 3/2011 | Fulknier et al. | 370/338 |
| 2011/0082390 A1 | 4/2011 | Krieter | |
| 2011/0218690 A1* | 9/2011 | O'Callaghan et al. | 700/295 |
| 2011/0291886 A1 | 12/2011 | Krieter | |
| 2011/0292869 A1 | 12/2011 | Krieter | |
| 2011/0292920 A1 | 12/2011 | Krieter | |
| 2011/0293182 A1 | 12/2011 | Krieter | |
| 2011/0295659 A1 | 12/2011 | Krieter | |
| 2011/0295691 A1 | 12/2011 | Krieter | |

OTHER PUBLICATIONS

Gill, Khusvinder et al., Transparent Heterogeneous Networks for Remote Control of Home Environments, Networking, Sensing and Control, 2008. ICNSC 2008. IEEE International Conference on Volume , Issue , Apr. 6-8, 2008, pp. 1419-1424.

Thonet, Gilles et al., ZigBee—WiFi Coexistence, ZigBee White Papers, Schneider Electric, Apr. 2008, Issue 01, pp. 1-38.

* cited by examiner

SYSTEM AND METHOD FOR PROVIDING WI-FI ACCESS TO ELECTRONIC DEVICES IN A PERSONAL AREA NETWORK (PAN)

FIELD OF INVENTION

The present invention generally relates to Personal Area Networks (PANs), and more particularly to, providing Wi-Fi access to electronic devices in a PAN.

BACKGROUND

Personal Area Networks (PANs), typically, are networks that interconnect devices over short distances. An increasingly popular form of PANs is the Wireless PAN or WPAN, which may encompass technologies like Bluetooth and IEEE 802.15.4. These technologies may be used to wirelessly interconnect electronic devices separated by short distances or ranges. For example, a wireless headset may be connected to a cellular phone using WPAN technology.

A recent trend in the field of WPANs is the increasing use of its technology towards deployment of products used for networked sensing, monitoring, and controlling applications. IEEE 802.15.4 has been the preferred WPAN technology for such applications due to its low power and low cost proposition. IEEE 802.15.4 typically transfers a few bytes of sensor readings between devices using very low bandwidth, and low power. The low power proposition gives IEEE 802.15.4 an advantage over other wireless technologies, such as Wireless Fidelity (Wi-Fi). Further, IEEE 802.15.4 also extends the physical range of connectivity as multiple devices interconnect in an ad-hoc fashion to form a self-configuring hopping-based network. Furthermore, IEEE 802.15.4 uses a free 2.4 GHz band and the IEEE-defined 802.15.4 standard, and, unlike many wireless licensed technologies, IEEE 802.15.4 is an open standard.

In homes, IEEE 802.15.4 technology may be extended to electronic devices, such as those developed for lighting, heating, ventilating, air conditioning and even security applications. Interconnecting electronic devices using IEEE 802.15.4 technology precludes the cost of laying expensive cable, and, enables remote controlling of multiple systems while providing flexibility in managing these electronic devices.

While the low power proposition of IEEE 802.15.4 is its biggest advantage, IEEE 802.15.4 severely limits the range of controlling these devices, and, as such the IEEE 802.15.4 equipped devices cannot be accessed in a universal manner. There is a need for universally accessing the IEEE 802.15.4 equipped devices and in order to control such devices from remote locations. Solutions in the art have proposed connecting a IEEE 802.15.4 cluster to an Internet Protocol (IP) based network, such as a Wi-FI network, by using a bridge. However, bridges are inefficient, cumbersome and difficult to maintain. Moreover, setting up of bridges interconnecting a IEEE 802.15.4 cluster to the Wi-Fi network can be fairly complex.

Based on the foregoing, there is a need for providing access to electronic devices interconnected using a WPAN technology, such as IEEE 802.15.4, to a Wi-Fi network to enable universal access to these electronic devices. Further, there is a need for providing access to electronic devices in a PAN to a Wi-Fi network in a cost-effective manner. Furthermore, there is a need for providing access to electronic devices in a PAN to a Wi-Fi network precluding complexity in setting up and managing the interconnection between the PAN network and the Wi-Fi network.

BRIEF SUMMARY OF THE INVENTION

An object of the present invention is to provide access to electronic devices interconnected using a WPAN technology, such as IEEE 802.15.4, to a Wi-FI network to enable universal access to these electronic devices.

Another object of the present invention is to provide access to the electronic devices in a PAN to a Wi-Fi network in a cost-effective manner.

Yet another object of the present invention is to provide access to the electronic devices in a PAN to a Wi-Fi network precluding complexity in setting up and managing the interconnection between the PAN network and the Wi-Fi network.

To achieve the objects of the present invention, an embodiment of the present invention provides a system comprising a plurality of electronic devices in a PAN. A Wi-FI compatible server is associated with each electronic device of the plurality of electronic devices. The Wi-Fi compatible server associated with each electronic device is capable of configuring a Hyper Text Markup Language (HTML) data for the associated electronic device. The HTML data associated with each electronic device is capable of being provided to a Wireless Local Area Network (WLAN) device for providing Wi-Fi access to the each electronic device of the plurality of electronic devices.

In another embodiment of the present invention, a method for providing Wi-Fi access to electronic devices is suggested. According to the method, a plurality of electronic devices in a PAN is provided. A Wi-FI compatible server is associated with each electronic device of the plurality of electronic devices. The Wi-Fi compatible server associated with each electronic device is capable of configuring a HTML data for the associated electronic device. The HTML data associated with the each electronic device is then provided to a WLAN device for providing Wi-Fi access to each electronic device in the PAN.

In another embodiment, the present invention provides a system for providing access to a networked device, comprising: a personal area network; a first device contained within the personal area network; a server coupled to the first device; and a viewing device coupled to the personal area network, the viewing device configured to receive data from the server related to the first device.

In another embodiment, the present invention provides a method of accessing a network device, comprising the steps of: generating data at a first device within a personal area network; receiving the data at a server from the first device; formatting, at the server, the data into a formatted data; transmitting the formatted data to a viewing device; and displaying, at the viewing device, the formatted data as a web page.

In yet another embodiment, the present invention provides a system for providing access to a personal area network, comprising: a Zigbee network; a first device contained within the Zigbee network, the first device serving as a Zigbee coordinator; a second device contained within the Zigbee network, the second device serving as a Zigbee router; a third device contained within the Zigbee network, the third device serving as a Zigbee End Device; a wireless local area network coupled to the Zigbee network; and a viewing device configured to access at least one of the first device, the second device, and the third device through the wireless local area network.

Providing access to each electronic device to the WLAN device, i.e., providing Wi-Fi access to each electronic device enables universal access to these electronic devices. As a result, the electronic devices may be remotely managed and controlled. Moreover, associating a Wi-Fi compatible server with each electronic device precludes the need to use expensive and cumbersome bridges, thereby providing a cost-effective solution. Moreover, such a solution precludes the complexity in setting up bridges and managing the interconnection between the PAN network and the Wi-Fi network.

BRIEF DESCRIPTION OF THE DRAWINGS

The preferred embodiments of the invention will hereinafter be described in conjunction with the figures provided herein to further illustrate various non-limiting embodiments of the invention, wherein like designations denote like elements, and in which.

DETAILED DESCRIPTION OF THE EMBODIMENTS

In the following detailed description of the embodiments of the invention, numerous specific details are set forth in order to provide a thorough understanding of the embodiments of the invention. However, it will be obvious to one skilled in the art that the embodiments of the invention may be practiced without these specific details. In other instances well known methods, procedures, components, and circuits have not been described in detail so as not to unnecessarily obscure aspects of the embodiments of the invention.

Furthermore, it will be clear that the invention is not limited to these embodiments only. Numerous modifications, changes, variations, substitutions and equivalents will be apparent to those skilled in the art without parting from the spirit and scope of the invention.

The embodiments of the invention provide a system and method for providing Wi-Fi access to electronic devices in a Personal Area Network (PAN). A plurality of electronic devices in a PAN is provided. A Wi-FI compatible server is associated with each electronic device in the PAN. The Wi-Fi compatible server associated with each electronic device is capable of configuring a HTML data for the associated electronic device. The HTML data associated with the each electronic device is then provided to a WLAN device for providing Wi-Fi access to each electronic device in the PAN. Providing Wi-Fi access to electronic devices in such a manner enables universal access to the electronic devices, and, moreover, such solutions are cost-effective and less cumbersome to set-up and manage.

Figure 1:
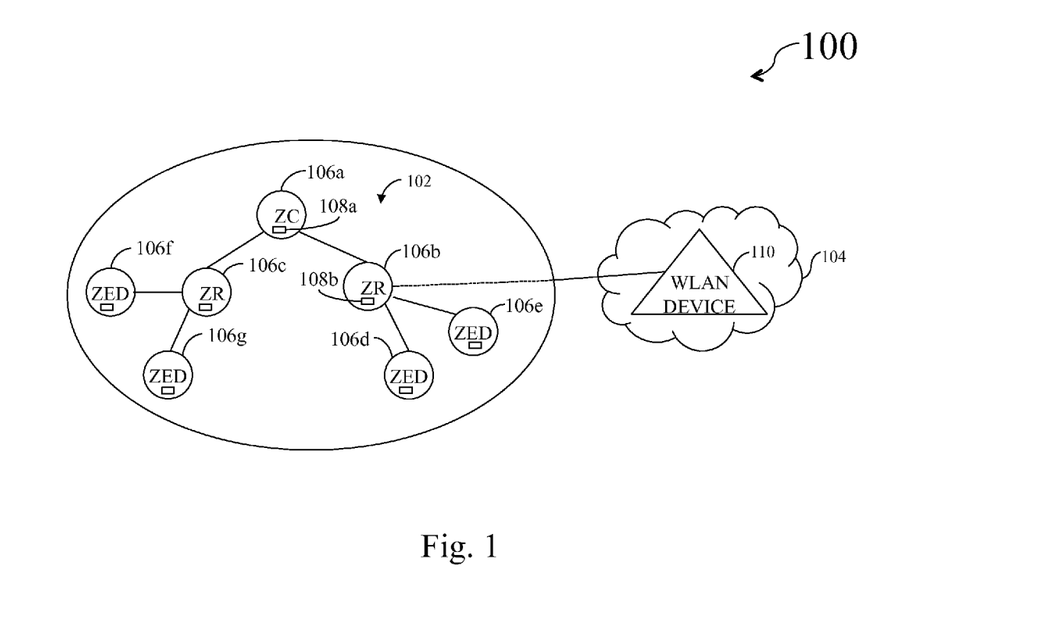
FIG. 1 illustrates an environment including a system for providing access to the plurality of electronic devices in a PAN to a Wi-FI network, in accordance with an embodiment of the present invention.

Referring now to FIG. 1, an environment 100 including a system 102 for providing access to the plurality of electronic devices in a PAN to a Wi-FI network 104 is illustrated, in accordance with an embodiment of the present invention. The environment 100 may be a home, a building, a residential space, an office space, a commercial/industrial area, and the like. The system 102 includes a plurality of electronic devices, such as electronic device 106a, electronic device 106b, electronic device 106c, electronic device 106d, an electronic device 106e, an electronic device 106f and an electronic device 106g. The electronic devices 106a, 106b, 106c, 106d, 106e, 106f and 106g will hereinafter be collectively referred to as plurality of electronic devices 106 (not explicitly labeled in FIG. 1).

In an embodiment of the present invention, an electronic device 106 is a home automation and control device. Examples of home automation and control devices may include lighting devices, heating devices, air conditioning modules, environmental condition sensors, security alarms, electronic appliances such as lamps, toasters and the like. It will be evident to a person skilled in the art that the home automation and control devices are mentioned herein for exemplary purposes and the invention is not limited to the examples mentioned herein.

The plurality of electronic devices 106 configures a PAN. More specifically, the plurality of electronic devices 106 configures a WPAN, and establishes communication amongst electronic devices of the plurality of electronic devices 106.

In an exemplary embodiment of the present invention, the PAN network is a IEEE 802.15.4 Network and utilizes IEEE 802.15.4 protocol for communication amongst and between the electronic devices 106 in the PAN. Standard IEEE 802.15.4 security and management may be used to automatically configure and maintain the IEEE 802.15.4 network. All operational types may be allowed including beacon and non-beacon operation. Within the IEEE 802.15.4 protocol, three types of elements are typically used; IEEE 802.15.4 Coordinator (ZC), IEEE 802.15.4 Router (ZR) and IEEE 802.15.4 End Devices (ZED). The ZC sets up the network as root. Only one ZC is allowed in the network. The ZR passes on data and reports network changes. The ZED utilizes the lowest power of the three elements as it only needs to communicate when a change, such as change in status, occurs.

The electronic devices 106 in the PAN may accordingly function as ZC, ZR and ZED. In FIG. 1, such an exemplary arrangement is depicted, wherein the electronic device 106a functions as IEEE 802.15.4 Coordinator (ZC), the electronic devices 106b and the electronic devices 106c function as IEEE 802.15.4 Routers (ZR) and the electronic devices 106d, 106e, 106f and 106g function as IEEE 802.15.4 End Devices (ZED). The IEEE 802.15.4 network, hence formed, is a self-configuring hopping network. In another embodiment of the present invention, the PAN network is an ad-hoc self-configuring mesh network.

Each electronic device 106 in the PAN is associated with a Wi-FI compatible server. For instance, the electronic device 106a is associated with a Wi-Fi compatible server 108a and the electronic device 106b is associated with Wi-Fi compatible server 108b. It will be evident to a person skilled in the art that though electronic devices 106c, 106d, 106e, 106f and 106g are associated with respective Wi-Fi compatible servers, such as Wi-Fi compatible server 108a. The Wi-Fi compatible servers associated with electronic devices 106c, 106d, 106e and 106f are not shown in FIG. 1. The Wi-Fi compatible servers, such as 108a and 108b, will herein be collectively referred as Wi-Fi compatible servers 108 (not explicitly labeled in FIG. 1). In an embodiment, each Wi-Fi compatible server of the Wi-Fi compatible servers 108 is a Hyper Text Transfer Protocol (HTTP) server.

The Wi-Fi compatible servers 108 are capable of configuring a HTML data for each associated electronic device. For example, the Wi-Fi compatible server 108a associated with the electronic device 106a may configure a HTML data for the electronic device 106a; the Wi-Fi compatible server 108b associated with the electronic device 106b may configure a HTML data for the electronic device 106b, and so forth. In an embodiment, the HTML data is configured in form of a web page capable of being provided to a WLAN device for providing access to the electronic device to a Wi-Fi network.

In another embodiment of the present invention, a master HTML configuration file capable of linking web pages associated with each electronic device 106 in the PAN is maintained on each electronic device 106 by the respective Wi-Fi compatible server associated with each electronic device 106. The web page associated with each electronic device 106 may include information such as active status, configuration and control elements. The HTML data associated with each electronic device 106 in the PAN in form of a web page, and, the master HTML configuration file linking all web pages, together, provide a logically enclosed unified Wi-Fi wrapper for connecting to a WLAN device of a Wi-Fi network, such as the Wi-Fi network 104. The unified Wi-Fi wrapper (depicted in FIG. 1 as a circle enclosing system 102) may appear to the connected Wi-Fi network as a series of HTML-configuration control pages.

The Wi-Fi network 104 in FIG. 1 is depicted to include a WLAN device 110. In an embodiment, the WLAN device 110 is a wireless access point. It will be evident to a person skilled in the art, that the Wi-Fi network 104 may include multiple WLAN devices, such as access points, routers, gateways connecting the WLAN to the IP-based network, i.e., the Internet, but is only depicted to include WLAN device 110.

The HTML data associated with each electronic device may be provided to the WLAN device 110 for providing Wi-Fi access to the electronic device. It will be evident to a person skilled in the art that such the Wi-Fi compatible server associated with each electronic device may establish a Wi-Fi connection, i.e. a Transmission Control Protocol (TCP)/Internet Protocol (IP) connection with the WLAN device 110 for providing the HTML data associated with each electronic device to the WLAN device 110.

The master HTML configuration file linking all web pages may similarly be provided to the WLAN device 110 for providing Wi-Fi access to the plurality of electronic devices. The master HTML configuration file is explained in further detail in conjunction with FIG. 2. The WLAN device may be a computer, laptop, personal digital assistant, mobile device, or any other device capable of accessing the network on which the electronic devices 106 reside.

Figure 2:
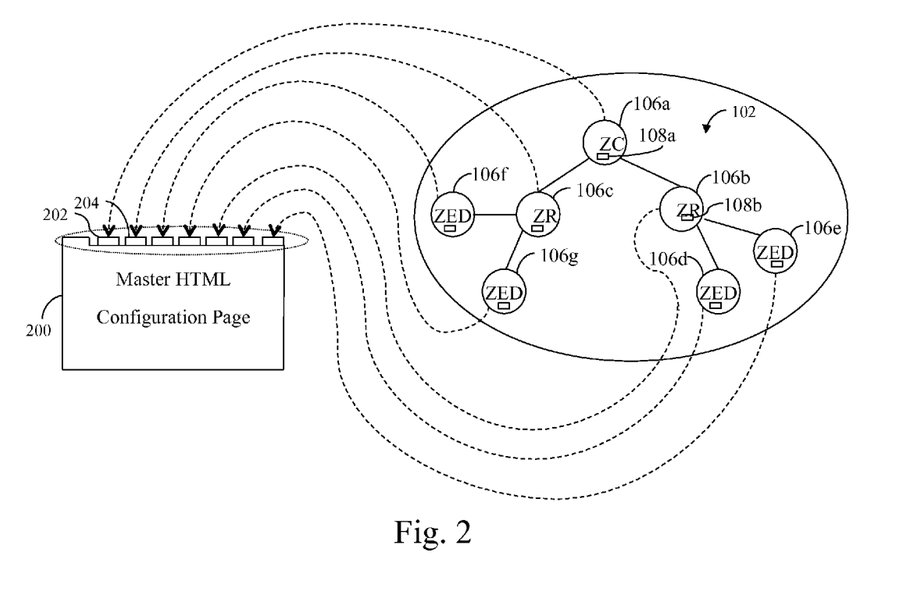
FIG. 2 illustrates a logical visual representation of master HTML configuration file linking HTML data in form of a web page associated with each electronic device in the PAN of FIG. 1, in accordance with an embodiment of the present invention.

FIG. 2 illustrates a logical visual representation of master HTML configuration file 200, in accordance with an embodiment of the present invention. As explained in conjunction with FIG. 1, the master HTML configuration file 200 links HTML data in form of a web page associated with each electronic device in the PAN 106. The server may reside locally or remotely from the electronic device 106.

The web page associated with each electronic device is depicted in form of a tab, such as tab 202 for web page associated with electronic device 106a, tab 204 for web page associated with electronic device 106b, and so forth. The master HTML configuration file 200 is used to control relationships between the web pages of the electronic devices 106 in the PAN. A copy of the master HTML configuration file is maintained on each electronic device 106 in the PAN. The individual web pages are dependent only on the electronic device they pertain to, and the web pages are kept current and updated specifically by the associated electronic device.

As explained in conjunction with FIG. 1, the master HTML configuration file 200 may be accessed through the Wi-Fi network 104 (shown in FIG. 1) using a WLAN device, such as the WLAN device 110 of FIG. 1. Individual web page corresponding to an electronic device 106 in the PAN may be accessed by selecting a tab corresponding to the web page of desired electronic device, and a configuration or status of the electronic device may be controlled by manipulating the HTML data on the web page. For example, a web page for an electronic device, such as an electric lamp or a toaster, may depict an 'OFF' status as its current configuration. A user may access the webpage corresponding to this particular electronic device from the master HTML configuration file and manipulate the status to depict an 'ON' status, thereby remotely controlling the electronic device. Further, in addition to providing real-time control, individual web pages also report real time status of the electronic devices 106.

Thus, each electronic device 106 in the PAN may be accessed and controlled from remote locations using a Wi-Fi network, such as the Wi-Fi network 104, to access the master HTML configuration file. The firmware architecture 300 for providing such an access to the electronic device to the Wi-Fi network is explained in conjunction with FIG. 3.

Figure 3:
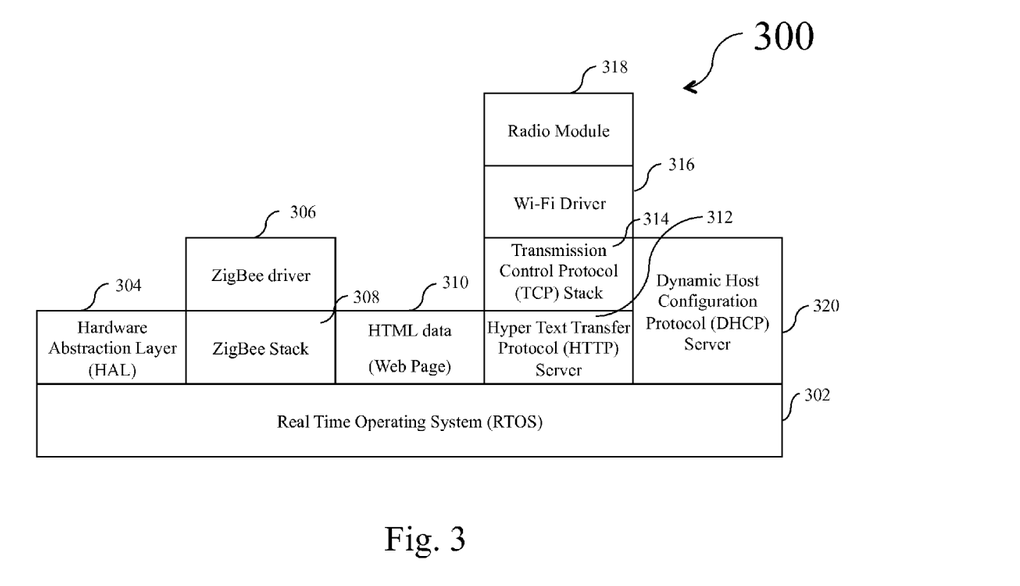
FIG. 3 is a block diagram illustrating exemplary architecture of firmware in each electronic device in the PAN for providing access to each electronic device to the Wi-Fi network, in accordance with an embodiment of the present invention.

FIG. 3 is a block diagram illustrating architecture of exemplary firmware 300 in each electronic device 106 in the PAN for providing access to each electronic device to a Wi-Fi network, in accordance with an embodiment of the present invention. The firmware 300 serves to connect an electronic device connected in a IEEE 802.15.4 network to the Wi-Fi network, such as the Wi-Fi network 104 of FIG. 1. When a Wi-Fi connection is established with the electronic device, the HTML data associated with the electronic device is made available along with the HTML data of the electronic devices 106 in the PAN and the master HTML configuration file (as explained in conjunction with FIG. 2) to the Wi-Fi network.

The firmware architecture 300 is depicted to provide operations for the IEEE 802.15.4 network, the firmware architecture 300 may be modified to cater to any desired PAN network or any such ad-hoc network.

The firmware 300 includes a Real Time Operating System (RTOS) 302, a Hardware Abstraction Layer (HAL) 304, a IEEE 802.15.4 driver 306, a IEEE 802.15.4 Stack 308, HTML data 310 in form of web page, a HTTP server 312, a Transmission Control Protocol (TCP) stack 314, a Wi-Fi Driver 316, a radio module 318 and Dynamic Host Configuration Protocol (DHCP) server 320.

The RTOS 302 is a customizable resource-efficient operating system capable of managing various components of the firmware architecture 300 as well as facilitating high level network operations. In an embodiment, the RTOS 302 is designed to run on a PIC 18 series microcontroller from Microchip Technologies, Inc. (Microchip).

The HAL 304 is a custom utility that is unique for each electronic device 106 in the PAN. The HAL 304 is provided to interface the electronic device to specific ancillary hardware configurations external to each electronic device 106. The HAL 304 is also designed to alter the content of the HTML data 310.

The IEEE 802.15.4 driver 306, the IEEE 802.15.4 stack 308, the TCP stack 314, the HTTP server 312 and the DHCP server 320 perform typical functions known in the art. In accordance with an embodiment of the present invention, the IEEE 802.15.4 driver 306, the IEEE 802.15.4 stack 308, the TCP stack 314, the HTTP server 312 and the DHCP server 320 are all supplied as a part of the PIC 18 development suite by Microchip.

The HTML data 310 in form of web page is contained in the resident flash memory and is unique to each electronic device 106 in the PAN, and, as explained in conjunction with FIG. 1, may include items such as status, configuration and control elements of the electronic device in addition to specific data such as serial numbers and security keys. The format of the web page may be defined by the requirements of the HTTP server 312. In an embodiment, the HTTP server 312 is provided in form of an 8051 microprocessor.

In an embodiment, the Wi-Fi driver 316 and related interface firmware are supplied as a standalone utility by Cambridge Silicon Radio Corporation (CSR) with code targeted towards PIC environment. The Wi-Fi driver 316 and related interface firmware may be specific to UF1050, a Wi-Fi solution geared towards both 802.11 b and g operations, and used by the electronic devices 106 in the PAN. The Wi-Fi driver 316 and related interface firmware may need to be modified to include simulcast interference avoidance with a IEEE 802.15.4 radio.

The radio module 318 may include a IEEE 802.15.4 radio, a Wi-Fi radio and a Radio Frequency (RF) front-end for communication purposes. The IEEE 802.15.4 radio, the Wi-Fi radio and the RF front-end will be explained in detail in conjunction with FIG. 4.

Figure 4:
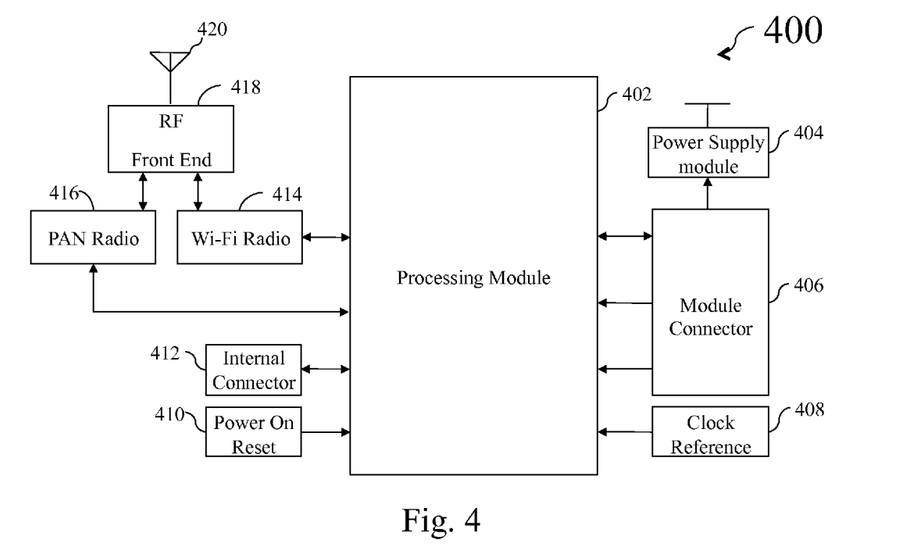
FIG. 4 is a block diagram illustrating exemplary hardware module in each electronic device in the PAN of FIG. 1, in accordance with an embodiment of the present invention.

FIG. 4 is a block diagram illustrating exemplary hardware module 400 in each electronic device 106 in the PAN for providing access to each electronic device to a Wi-Fi network, in accordance with an embodiment of the present invention. The hardware module 400 includes a base processing module 402, a power supply module 404, a module connector 406, a clock reference 408, a Power On Reset 410, an internal connector 412, a Wi-Fi radio 414, a PAN radio 416, a RF front-end 418 and an antenna 420.

The processing module 402 may include typical connectors such as those for Serial Peripheral Interface (SPI) controllers, General Purpose Input/Output (GPIO), analog to digital converters, analog comparators, debug and development modules, reset, phased locked loop (PLL) and internal flash memory. The connectors as mentioned herein may perform typical functions known in the art.

Additional hardware may be integrated into the electronic device utilizing the analog to digital converters. The analog comparators and digital GPIO inputs resident on the processing module 402 and can be connected by external components to the processing module 402 through solderable pins. In an embodiment, all firmware and data is stored in the internal flash memory. The PLL may receive external clock reference from the clock reference unit 408. An external clock reference may be required because of strict Real Time Clock (RTC) constraints required to support IEEE 802.15.4 network beacons. The debug and development connector on the processing module 402 may allow for factory programming of unit-specific information such as serial numbers and security keys. In an embodiment, the processing module 402 is a PIC18F87J10.

The power supply module 404 may use a linear regulation. Further, the power supply module 404 also provides different voltage forms that may be needed, as well as provides RF and analog noise isolation. The module connector 406, the Power On Reset 410 and an internal connector 412 may perform typical functions known in the art.

The Wi-Fi radio 414 is capable of establishing a connection of the electronic device with the Wi-Fi network. More specifically, the Wi-Fi radio 414 is capable of communicating with a WLAN device, such as the WLAN device 110 of FIG. 1. The PAN radio 416 creates and maintains a standard PAN network connection with other the electronic devices 106 in the PAN connected in PAN network as explained in conjunction with FIG. 1. As explained in conjunction with FIGS. 1 to 3, the PAN network may be a IEEE 802.15.4 network and the PAN radio 416 may be a IEEE 802.15.4 radio. The RF front-end 418 is capable of switching between the Wi-Fi radio 414 and the PAN radio 416 based on communication with one of the electronic devices 106 and the WLAN device. The switching of radio may be performed to avoid simultaneous transmission by the Wi-Fi radio 414 and the PAN radio 416, thereby reducing interference, as may be the case of IEEE 802.15.4 network, which operates in the same 2.4 GHz band as the Wi-Fi network. In an embodiment, PAN radio 416 is a MRF24J40 IEEE 802.15.4 radio and the Wi-Fi Radio 414 is a CSR UF10150 radio. In an embodiment, the RF front-end can be RF Arrays Inc.'s RWF111 Low Noise Amplifier (LNA)/Power Amplifier (PA) design front-end.

In an embodiment, establishment of a Wi-Fi connection (explained in conjunction with FIG. 1) may be performed based on analysis of Receive Signal Strength Indicator (RSSI) available from the Wi-Fi radio 414. The speed of the Wi-Fi connection may not be restricted. However, in case of IEEE 802.15.4 network, the intrinsic speed of the Wi-Fi connection may be limited by inherent IEEE 802.15.4 connectivity limitations. Hence, actions such as general network browsing and high-bit data streaming or any other data connection apart from simple HTTP may not be supported. Moreover, the Wi-Fi access may be limited to single privileged access method that may be secured using WEP/WEP2 security. Configuration changes may further be protected by administrator authentication. In an embodiment, the Wi-Fi connection may be disallowed for ZED for reducing a power consumption of the ZED.

The antenna 420 serves to propagate data from one of Wi-Fi radio 414 and PAN radio 416. The antenna 420 may serve to connect the electronic device to the WLAN device to provide access for the electronic device to the Wi-Fi network. A method for providing access to the plurality of electronic devices in a PAN to a Wi-Fi network is explained in conjunction with FIG. 5.

Figure 5:
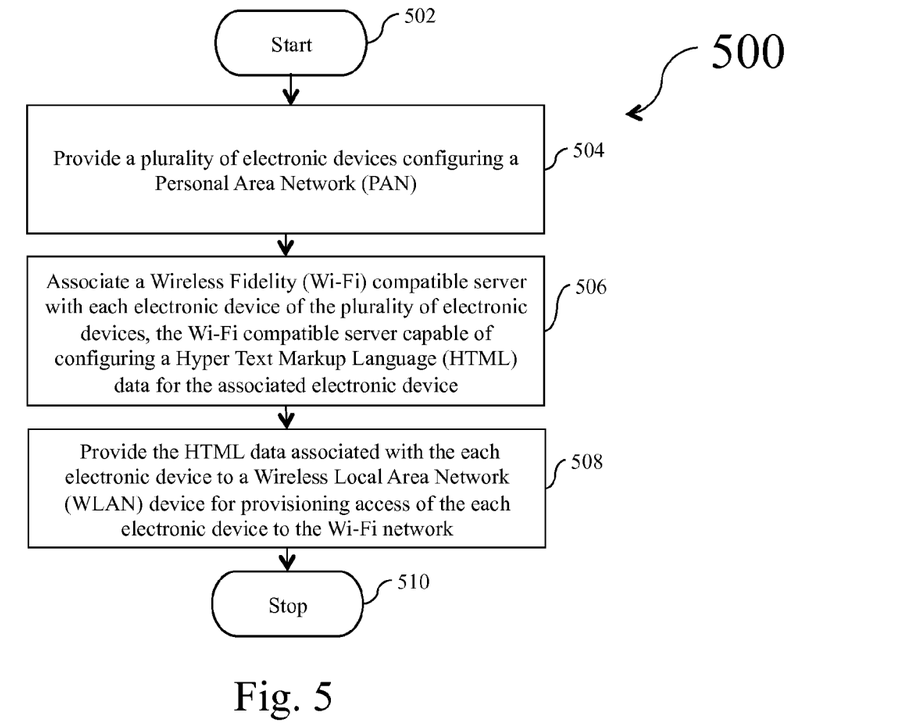
FIG. 5 illustrates a flow diagram of a method for providing access to the plurality of electronic devices in a PAN to a Wi-FI network, in accordance with an embodiment of the present invention.

FIG. 5 illustrates a flow diagram of a method 500 for providing access to the plurality of electronic devices in a PAN to a Wi-Fi network, in accordance with an embodiment of the present invention. The method 500 begins at 502. At 504, a plurality of electronic devices in a PAN is provided. At 506, a Wi-FI compatible server is associated with each electronic device in the PAN. The Wi-Fi compatible server is capable of configuring a HTML data for the associated electronic device. At 508, the HTML data associated with the each electronic device is provided to a WLAN device for providing access to each electronic device to the WLAN device. The method ends at 510.

In an embodiment, an electronic device of the plurality of devices is a home automation and control device. As explained in conjunction with FIG. 1, examples of home automation and control devices may be lighting devices, heating devices, air conditioning modules, sensors for sensing environmental conditions, security alarms, electronic gadgets such as lamps, toasters and the like. It will be evident to a person skilled in the art that the home automation and control devices are mentioned herein for exemplary purposes and the invention is not limited to the examples mentioned herein.

As explained in conjunction with FIG. 1, the PAN may be a WPAN and may use WPAN technology to establish a communication amongst the electronic devices 106. In an exemplary embodiment, the PAN network is a IEEE 802.15.4 network and utilizes the IEEE 802.15.4 standard for communication between the electronic devices 106 in the PAN. Standard IEEE 802.15.4 security and management may be used to automatically conFIG. and maintain the IEEE 802.15.4 network. All operational types may be allowed including beacon and non-beacon operation.

In an embodiment, the Wi-Fi compatible server associated with each electronic device in the PAN is Hyper Text Transfer Protocol (HTTP) server. In an embodiment, the HTTP server is an 8051 microprocessor. The Wi-Fi compatible server associated with each electronic device is capable of configuring a HTML data for each electronic device 106. In an embodiment, the HTML data is configured in form of a web page capable of being provided to a WLAN device for providing access to the electronic device to a Wi-Fi network. The HTML data associated with each electronic device may be provided to the WLAN device 110 for providing Wi-Fi access to the electronic device.

In another embodiment of the present invention, a master HTML configuration file capable of linking web pages associated with each electronic device in the PAN is maintained on each electronic device by the Wi-Fi compatible server associated with the each electronic device. The web page associated with each electronic device may include information such as active status, configuration and control elements. The HTML data associated with each electronic device in the PAN in form of a web page, and, the master configuration file linking all web pages provide a logically enclosed unified Wi-Fi wrapper for connecting to a WLAN device of a Wi-Fi network.

The Wi-Fi network may include a WLAN device, such as WLAN device 110 depicted in FIG. 1. In an embodiment, the WLAN device is a wireless access point. The Wi-Fi network may include multiple WLAN devices, such as access points, routers, gateways connecting the WLAN to the IP-based network, i.e., the Internet, however, this invention is not limited to the exemplary embodiments depicted in the figures herein.

In an embodiment, each electronic device in the PAN may include a PAN radio for communicating with electronic devices in the PAN, a Wi-Fi radio for communicating with the WLAN device, and a Radio Frequency (RF) front-end capable of switching between the PAN radio and the Wi-Fi radio based on one of communication of the each electronic device with an electronic device in the PAN and communication with the WLAN device.

The HTML data associated with each electronic device may be provided to the WLAN device for providing Wi-Fi access to the electronic device. The Wi-Fi compatible server associated with each electronic device may establish a Wi-Fi connection, i.e. a Transmission Control Protocol (TCP)/Internet Protocol (IP) connection with the WLAN device for providing the HTML data associated with each electronic device 106 to the WLAN device.

The present invention provides a system and method for providing Wi-Fi access to electronic devices in a PAN. Providing Wi-Fi access to electronic devices using Wi-Fi compatible servers enables universal access to the electronic devices, and, moreover, such solutions are cost-effective and are less cumbersome to set-up and manage. Moreover, such solutions combine the benefits of both PAN networks like IEEE 802.15.4, and, Wi-Fi networks. For instance, IEEE 802.15.4 provides low-power, low cost solution of devices and extends a physical range of Wi-Fi network as multiple devices interconnect to form a self-configuring hopping network, whereas, Wi-Fi provides universal access capability to the IEEE 802.15.4 network. Therefore, such a solution enables an efficient remote management and control of electronic devices, such as home automation and industrial devices.

While the principles of this disclosure have been illustrated in relation to the exemplary embodiments described herein, the principles of the disclosure are not limited thereto and include any modifications, variations or permutations thereof.

The invention claimed is:

1. A system for providing universal access to a device in a mesh network to a user in a cloud network, comprising:
   a plurality of devices in communication with one another in an interconnected mesh network;
   a server associated with each device to configure a Hyper Text Markup Language for generating a web page for the said device;
   an application module in the server capable of linking the web pages of all devices to generate a master web page,
   a WLAN device to establish a Wi-Fi connection with at least one device;
   a viewing device that enables the user to access the master web page in the cloud network.

2. The system of claim 1 wherein the cloud network is a local area network, internet, and wide area network.

3. The system of claim 1 wherein the plurality of devices is a home automation and control device.

4. The system of claim 1 wherein the interconnected mesh network is Zigbee™, IEEE 802.15.4.

5. The system of claim 1 wherein the server is wireless fidelity enabled server.

6. The system of claim 1 wherein the web page of the device displays the real time status of the device.

7. The system of claim 1 wherein the viewing device is a remote system connected to the internet.

8. A method for providing universal access to a device in a mesh network, to a user in a cloud network, comprising:
   configuring HTML data for a plurality of devices in communication with each other in an interconnected mesh network;
   generating web page for each device using the HTML data for the said device;
   creating on each device, a master web page having links to web page of all devices as a formatted data;
   establishing a Wi-Fi connection between at least one device and the WLAN using HTML Data of the said device;
   transmitting the formatted data to a server; and
   displaying to the user the formatted data as a web page in the cloud network.

9. The method of claim 8 wherein the cloud network includes internet, local Area Network, wide area network.

10. The method of claim 8 wherein the interconnected mesh network includes Zigbee™, IEEE 802.15.4.

11. The method of claim 8 wherein the plurality of device is a home automation and control device.

12. The method of claim 8 wherein the web page of the device displays real time status of the device.

13. The method of claim 8 wherein the server is compatible with Hyper Text Transfer protocol.

* * * * *